E. P. HINCHBERGER.
TROLLEY.
APPLICATION FILED MAY 4, 1912.
1,050,830.  Patented Jan. 21, 1913.
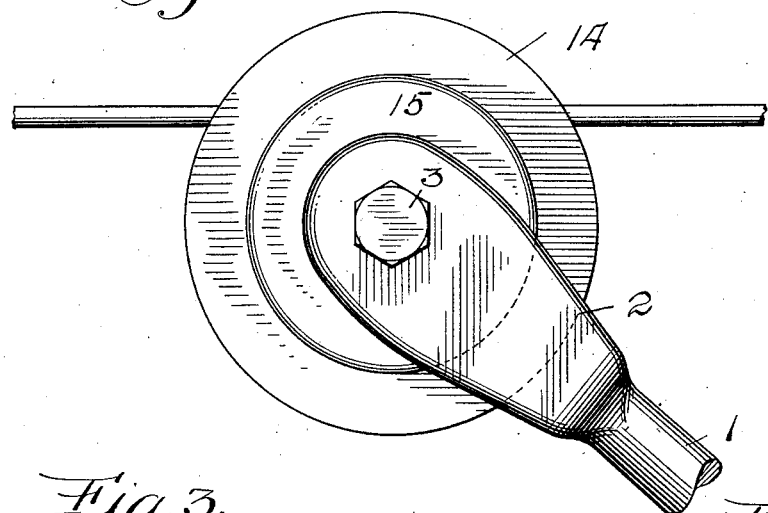
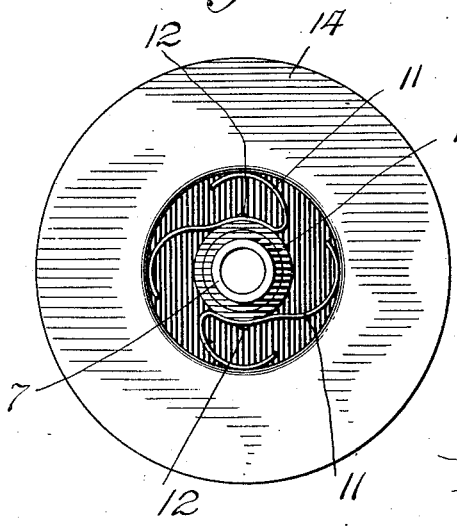
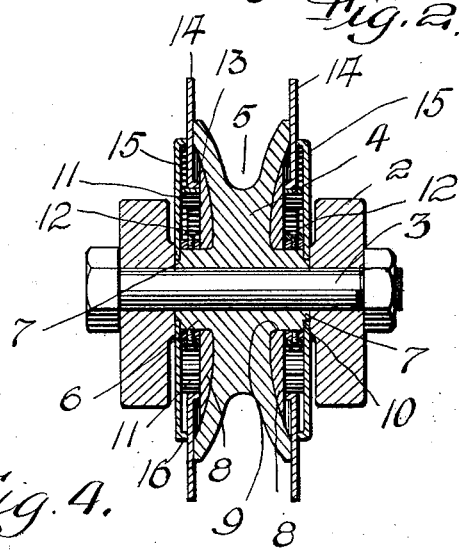
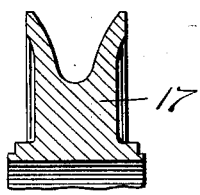
WITNESSES
Samuel Payne
Max H. Svoboda
INVENTOR
E. P. Hinchberger.
BY
ATTORNEYS

UNITED STATES PATENT OFFICE.

EDWARD P. HINCHBERGER, OF PITTSBURGH, PENNSYLVANIA.

TROLLEY.

1,050,830. Specification of Letters Patent. Patented Jan. 21, 1913.

Application filed May 4, 1912. Serial No. 695,242.

*To all whom it may concern:*

Be it known that I, EDWARD P. HINCHBERGER, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and more particularly to a trolley wheel that is supported in the harp of a trolley pole.

The primary object of my invention is to provide the ordinary type of trolley wheel with an attachment that increases the depth of the wire groove of the wheel and thereby reduces to a minimum the liability of the wheel becoming accidentally displaced relatively to a wire when passing over an irregular section of trolley wire, traveling at considerable speed, passing under switchfrogs, and when encountering conditions that would ordinarily displace a trolley wheel.

Another object of this invention is to provide a trolley wheel attachment embodying yieldable side plates that serve as guards for preventing a displacement of a trolley wire relatively to a wheel.

A further object of this invention is to provide a trolley wheel attachment that can be easily and quickly installed, manufactured at a comparatively small expense, and used without any liability of the over-head construction of the trolley system being injured or broken.

I attain the above objects by a mechanical construction that will be hereinafter specifically described and then claimed, and reference will now be had to the drawing, wherein:—

Figure 1 is a side elevation of a trolley in accordance with this invention. Fig. 2 is a cross sectional view of the same. Fig. 3 is a side elevation of a portion of the trolley attachment, and Fig. 4 is a cross sectional view of a trolley wheel in accordance with this invention.

In Figs. 1 to 3 inclusive my invention is applied to an ordinary trolley, wherein the reference numeral 1 denotes a portion of a trolley pole having harp arms 2 connected by a journal pin 3. Revolubly mounted upon said journal pin 3 is an ordinary trolley wheel 4 having an annular groove 5 and a hub 6. The ends of the hub 6 are reduced to provide annular shoulders 7 for a purpose that will presently appear. Arranged against the sides of the trolley wheel 4 are filler blocks 8 that are circular and provided with concentric openings 9 to receive the hub 6 of the trolley wheel. The outer sides of the filler blocks 8 are at right angles to the axis of the hub 6, and these filler blocks provide a substantial wall or surface against which springs, to be hereinafter referred to, can bear. Arranged upon the ends of the hub 6 are bearing rings 10 that engage the outer sides of the filler blocks 8. Secured to these rings are compound curved flat compression springs 11, said springs being secured to the rings 10 by rivets 12, screws or other fastening means. The curved ends of the springs 11 bear against annular inwardly projecting flanges carried by circular guard plates 14 arranged at the side of the trolley wheel 4. The flanges 13 engage the outer sides of the filler blocks 8 the springs engaging said flanges support the circular guard plates 14 normally concentric relatively to the journal pin 3. The springs 11 are of a greater width than the annular flanges 13, and engaging said springs are circular closure plates 15, said plates having peripheral inwardly projecting flanges 16 engaging the outer sides of the guard plates 14 and spacing the closure plates relatively to the filler blocks 8, whereby there will be sufficient clearance for the springs 11. The closure plates 15 are mounted upon the annular shoulders 7 of the hub 6 and are retained thereon by the inner sides of the harp arms 2.

In Fig. 4 there is illustrated a portion of a trolley wheel 17 and by comparing this wheel with the one wheel illustrated in Fig. 2, it will be observed that the web of a wheel is of a greater thickness than the wheel 4, thereby obviating the necessity of using the filler blocks 8.

From the foregoing it will be observed that the circular guard plates 14 are yieldably supported relatively to the hub 6 of the trolley wheel 4, consequently these guard plates can shift when the trolley wheel passes under a switch frog, guard rail or bridge plate. The compression springs that support the guard plates 14 concentrically relatively to the trolley wheel 4 are fully protected from the forces of nature by the closure plates 15. It will also be noticed that the guard plates 14 increase the depth of the annular groove 5, consequently the liability of said wheel becoming displaced is reduced to a minimum. Since the guard plates 14 and the closure plates 15 can be cut and stamped from sheet metal, the trolley wheel attachment can be manufactured at a comparatively small cost.

I would have it understood that the structural elements of my invention are susceptible to such changes and modifications as fall within the scope of the appended claims.

What I claim is:—

1. In an attachment for a trolley wheel, the combination with a wheel, of circular guard plates engaging the sides of said wheel, closure plates engaging the outer sides of said guard plates and spaced from the sides of said wheel, and means interposed between said wheel and the inner edges of said guard plates for yieldably supporting said guard plates.

2. The combination with a trolley wheel, of circular guard plates arranged at the sides of said wheel and increasing the depth of the groove thereof, bearing rings arranged upon the hub of said wheel, compression springs carried by said bearing rings and engaging the inner edges of said guard plates, and closure plates engaging the outer sides of said guard plates and inclosing said springs.

3. The combination with a trolley wheel, of circular filler blocks mounted upon the hub of said wheel at the sides of said wheel, circular guard plates arranged at the sides of said wheel and engaging said filler blocks, circular closure plates mounted upon the ends of the hub of said wheel and engaging said guard plates and means arranged between said filler blocks and said closure plates for yieldably supporting said guard plates.

4. A trolley wheel attachment comprising circular guard plates adapted to project beyond the edges of said wheel, closure plates engaging the outer sides of said guard plates, bearing rings inclosed by said closure plates, and means interposed between said bearing rings and the inner edges of said guard plates and adapted to yieldably support the same.

5. In a trolley wheel attachment, circular guard plates having annular inwardly projecting flanges, circular closure plates having annular inwardly projecting flanges engaging the outer sides of said guard plates, bearing rings arranged concentrically of said guard plates, and compound curved compression springs secured to said bearing rings and engaging the inwardly projecting flanges of said guard plates.

In testimony whereof I affix my signature in the presence of two witnesses.

EDWARD P. HINCHBERGER.

Witnesses:
MAX H. SROLOVITZ,
K. H. BUTLER.

---

Copies of this patent may be obtained for five cents each, by addressing the "Commissioner of Patents, Washington, D. C."